US 9,808,121 B2

(12) United States Patent
    Wu (10) Patent No.:     US 9,808,121 B2
(45) Date of Patent:      Nov. 7, 2017

(54) SEASONING MILL (71) Applicant: YIENN LIH ENTERPRISE CO., LTD., Tainan (TW)

(72) Inventor: Ming-Feng Wu, Tainan (TW)

(73) Assignee: YIENN LIH ENTERPRISE CO., LTD., Tainan (TW)

( * ) Notice: Subject to any disclaimer, the term of this patent is extended or adjusted under 35 U.S.C. 154(b) by 0 days.

(21) Appl. No.: 14/952,508

(22) Filed: Nov. 25, 2015

(65)         Prior Publication Data
    US 2017/0065128 A1    Mar. 9, 2017

(30)     Foreign Application Priority Data
    Sep. 9, 2015   (TW) .............................. 104214573 U (51) Int. Cl.
    *A47J 42/04*      (2006.01)
(52) U.S. Cl.
    CPC ..................... *A47J 42/04* (2013.01)
(58) Field of Classification Search
    CPC ................................. A47J 42/42; A47J 42/02
    USPC ....................................................... 241/169.1
    See application file for complete search history.

(56)              References Cited

U.S. PATENT DOCUMENTS

2009/0166455 A1*  7/2009  Pai ........................... A47J 42/04
                                                        241/93
2014/0353412 A1*  12/2014  Grumbacher ............ A24C 5/40
                                                        241/70

FOREIGN PATENT DOCUMENTS

TW            M383373         7/2010

* cited by examiner

*Primary Examiner* — R. K. Arundale
*Assistant Examiner* — Joseph Finan, Jr.
(74) *Attorney, Agent, or Firm* — Muncy, Geissler, Olds & Lowe, P.C.

(57)              ABSTRACT

A seasoning mill includes a receiving unit, a grinding unit disposed in the receiving unit, and a closure unit. The closure unit includes a stationary seat having at least one grinding opening, a rotation control seat having a cover wall formed with at least one control opening, and a coupling member for providing a resistive force between a coupling shaft and the rotation control seat such that the rotation control seat is co-rotatable with the coupling shaft relative to the stationary seat from a closed position to an opened position, and that the rotation control seat is capable of being maintained at the opened position when a rotational force exerted thereon is released.

13 Claims, 10 Drawing Sheets

SEASONING MILL

CROSS-REFERENCE TO RELATED APPLICATION

This application claims priority of Taiwanese Application No. 104214573, filed on Sep. 9, 2015.

FIELD

The disclosure relates to a mill, more particularly to a seasoning mill for grinding food materials such as pepper and crude salt.

BACKGROUND

A conventional seasoning mill is designed to grind food materials, such as peppercorns, by rotating members thereof relative to each other. However, the residues left in the conventional seasoning mill may still fall out when the conventional seasoning mill is stored on a dining table or in a cabinet, thereby making the dining table or the cabinet unclean.

Figure 1:
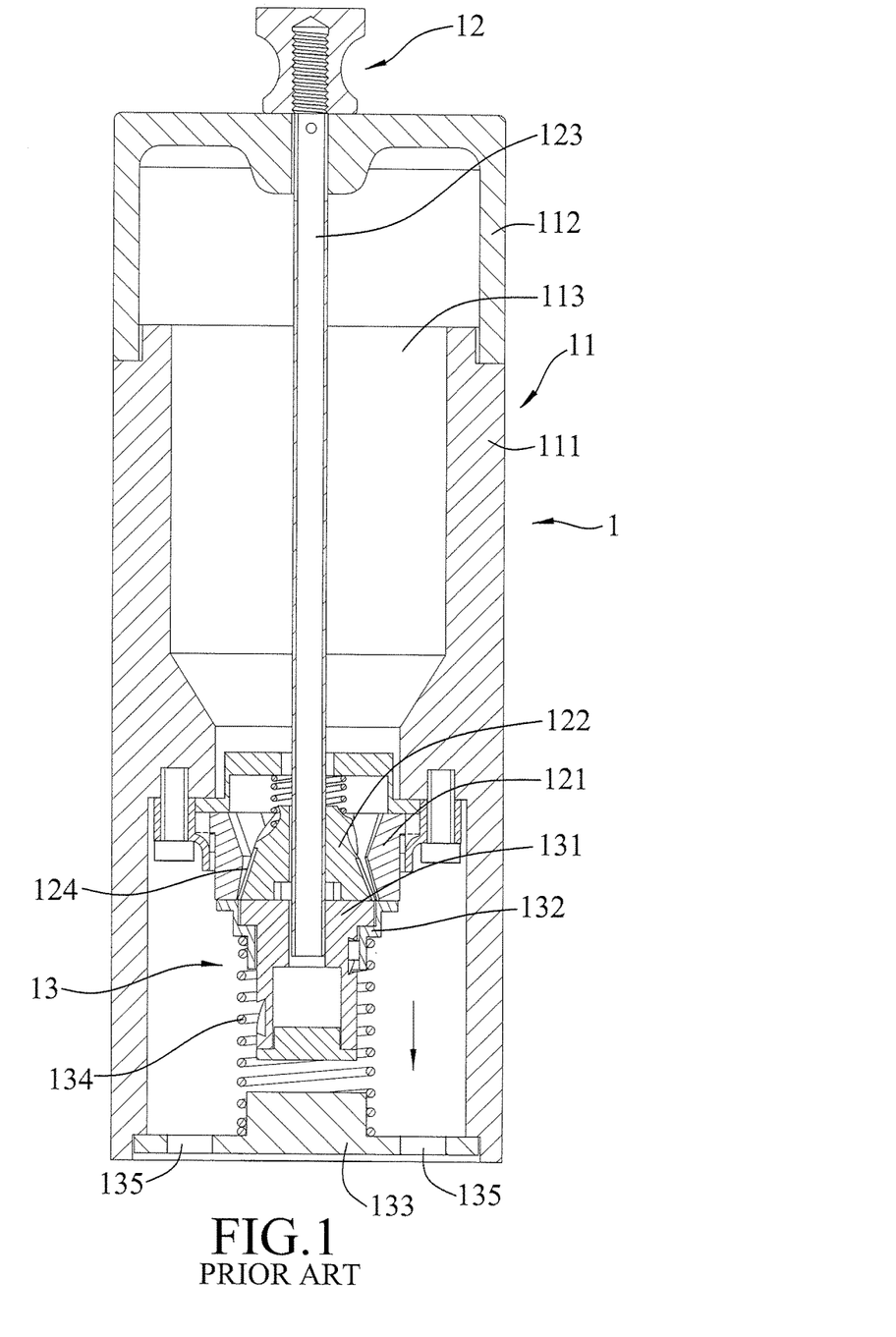
FIG. 1 is a cross section view of the Utility Patent NO. M383373.
Figure 2:
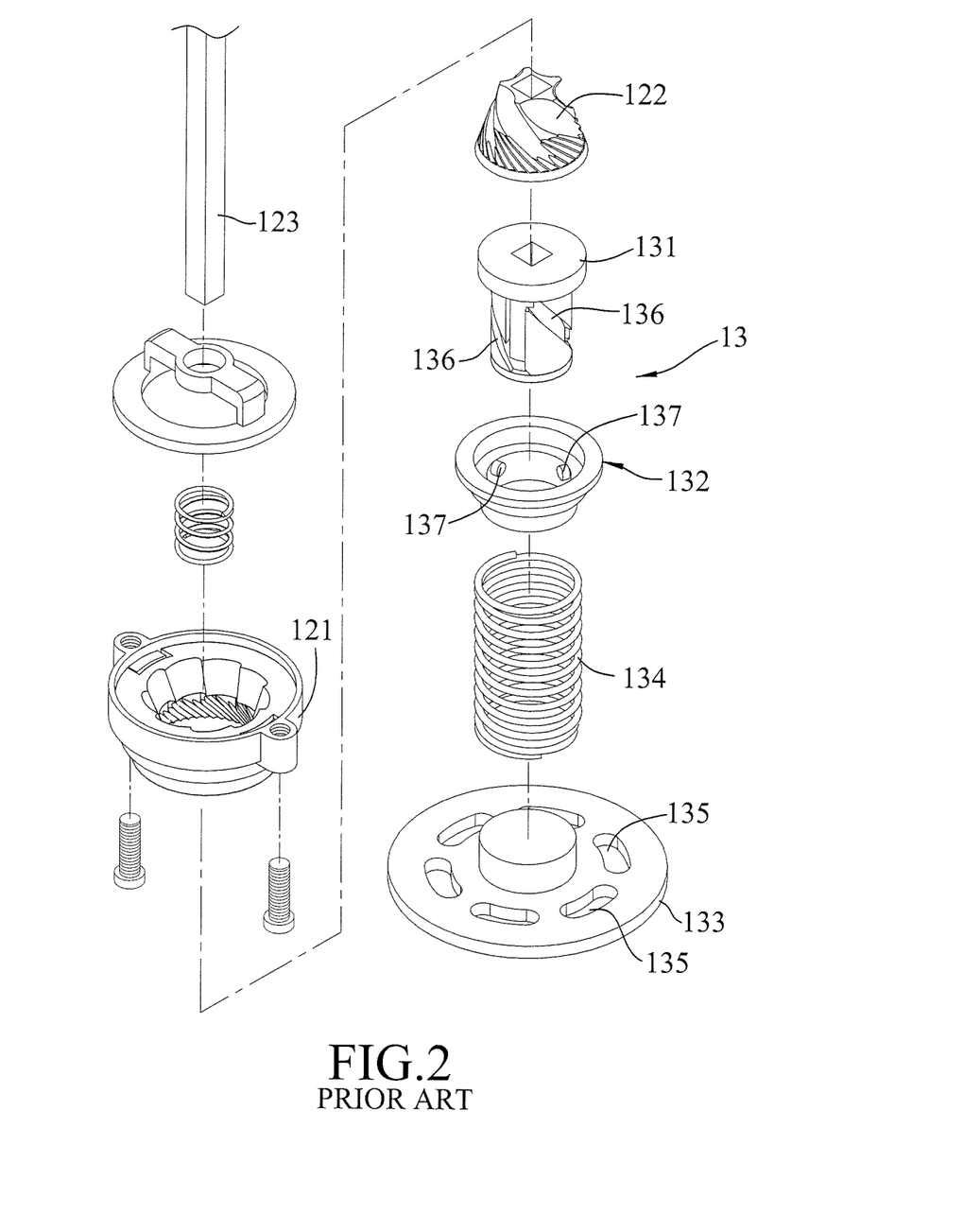
FIG. 2 is a fragmentary exploded view of the FIG. 1.

In order to alleviate the drawback, as shown in FIGS. 1 and 2, a conventional pepper mill 1 disclosed in the Taiwanese Utility Model Patent NO. M383373 includes a receiving unit 11, a grinding unit 12 mounted to the receiving unit 11, and a closure unit 13. The receiving unit 11 includes a container body 111, a cover body 112 rotatably coupled to the top of the container body 111, and a receiving space 113 cooperatively de fined by the container body 111 and the cover body 112. The grinding unit 12 includes an outer grinding seat 121 disposed fixedly in the receiving space 113, an inner grinding seat 122 surrounded by the outer grinding seat 121 and cooperating with the outer grinding seat 121 to define a grinding space 124, and a coupling shaft 123 coupled to the inner grinding seat 122 and the cover body 112 for rotatably driving the inner grinding seat 122 to rotate relative to the outer grinding seat 121.

The closure unit 13 includes a coupling member 131 co-rotatably connected to the coupling shaft 123, a closure member 132 sleeved on the coupling member 131, a perforated plate 133 fixedly disposed at the bottom of the container body 111, and a resilient member 134 supported between the perforated plate 133 and the closure member 132. The perforated plate 133 is formed with a plurality grinding openings 135, the coupling member 131 is formed with a plurality of helical guiding grooves 136, and the closure member 132 is formed with a plurality of guiding blocks 137 respectively movable along the guiding grooves 136.

When the conventional pepper mill 1 is at a closed position as shown in FIG. 1, the resilient member 134 biases upwardly the closure member 132 to abut against the bottom of the outer grinding seat 121 and block the grinding space 124. When an user rotates the cover body 112, the inner grinding seat 122 is driven to rotate relative to the outer grinding seat 121 together with the coupling shaft 123 so as to grind peppercorns in the grinding space 124, while the coupling member 131 is simultaneously rotated to drive the closure member 136 to move downwardly against the resilient force of the resilient member 134 via slide engagement between the guiding blocks 137 of the closure member 132 and the guiding grooves 136, respectively, thereby converting the conventional pepper mill 1 to an opened position. This allows ground pepper to fall from the grinding space 124 into the receiving space 113 and then be discharged via the grinding openings 135 of the perforated plate 133. When the cover body 112 is released, the resilient member 134 automatically biases the closure member 132 to once again block the grinding space 124.

Although the abovementioned disclosure can prevent the residues from continuously dropping out from the grinding space 124 when the conventional pepper mill 1 is not in use, the structure of the closure unit 13 is relatively complicated, and the guiding blocks 137 and the guiding grooves 136 are required to be precisely arranged. Moreover, the resilient member 134 may experience elastic fatigue so that the grinding space 124 may not be properly blocked.

SUMMARY

Therefore, the object of the disclosure is to provide a seasoning mill that can alleviate the drawbacks associated with the abovementioned prior art.

Accordingly, a seasoning mill of the present disclosure includes a receiving unit, a grinding unit, and a closure unit. The receiving unit defines a receiving space therein. The grinding unit includes an outer grinding seat disposed fixedly in the receiving space, an inner grinding seat surrounded by the outer grinding seat, and a coupling shaft coupled to the inner grinding seat and rotatable for driving the inner grinding seat to rotate relative to the outer grinding seat. The closure unit includes a stationary seat, a rotation control seat, and a coupling member. The stationary seat is disposed fixedly in the receiving space and has at least one grinding opening. The rotation control seat has a cover wall formed with at least one control opening. The coupling member is disposed for providing a resistive force between the coupling shaft and the rotation control seat which tends to secure fixedly the rotation control seat onto the coupling shaft such that the rotation control seat is co-rotatable with the coupling shaft relative to the stationary seat from a closed position when a rotational force is exerted on the coupling shaft, where the at least one control opening is not registered with the at least one grinding opening and is blocked by the cover wall, to an opened position, where the at least one control opening is registered with the at least one grinding opening, and that the rotation control seat is capable of being maintained at the opened position when the rotational force is released.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Before the present disclosure is described in greater detail, it should be noted that like elements are denoted by the same reference numerals throughout the disclosure.

Figure 3:
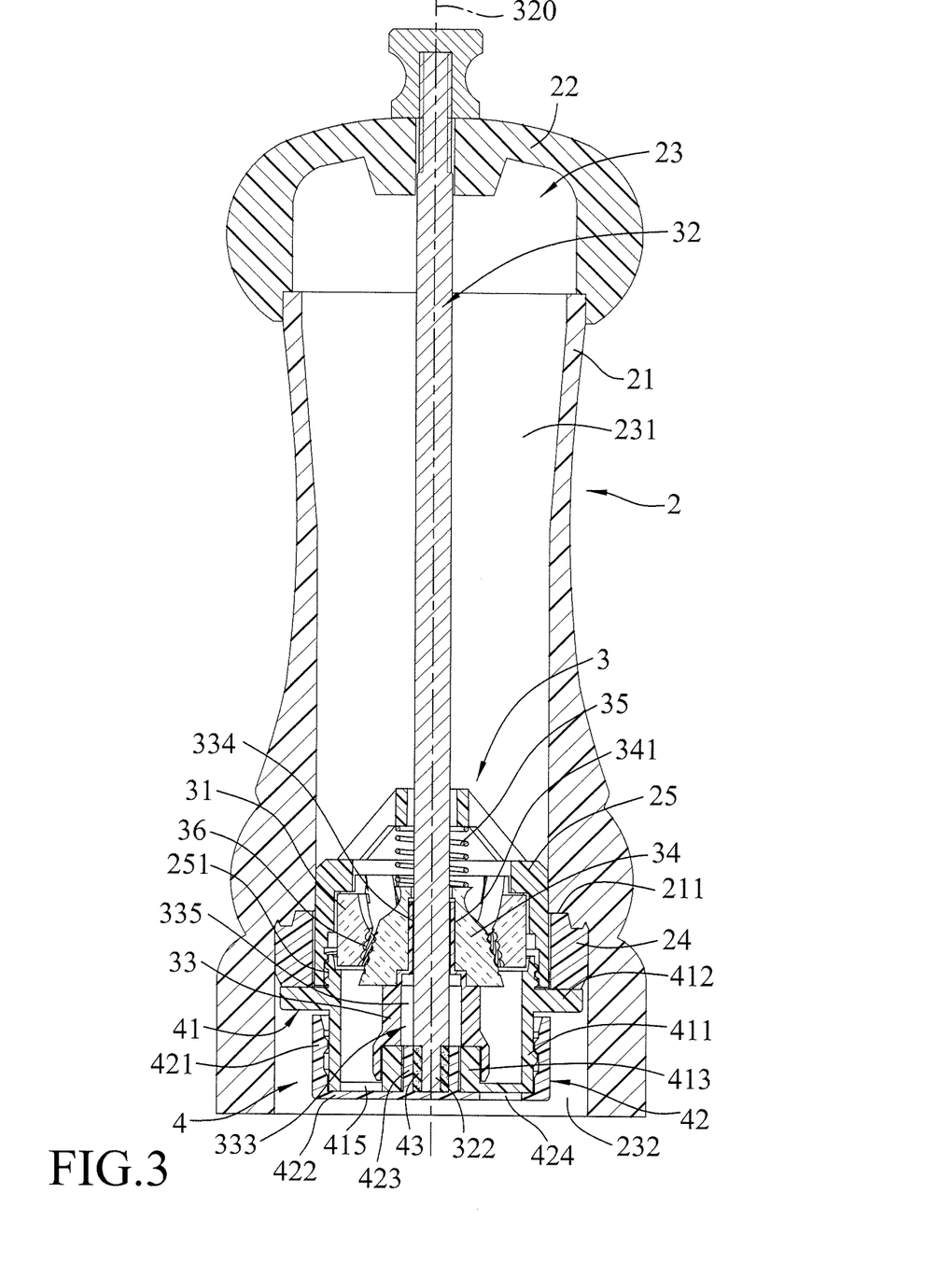
FIG. 3 is a cross section view of a first embodiment of a seasoning mill according to the disclosure, and the disclosure is at a closed position.
Figure 4:
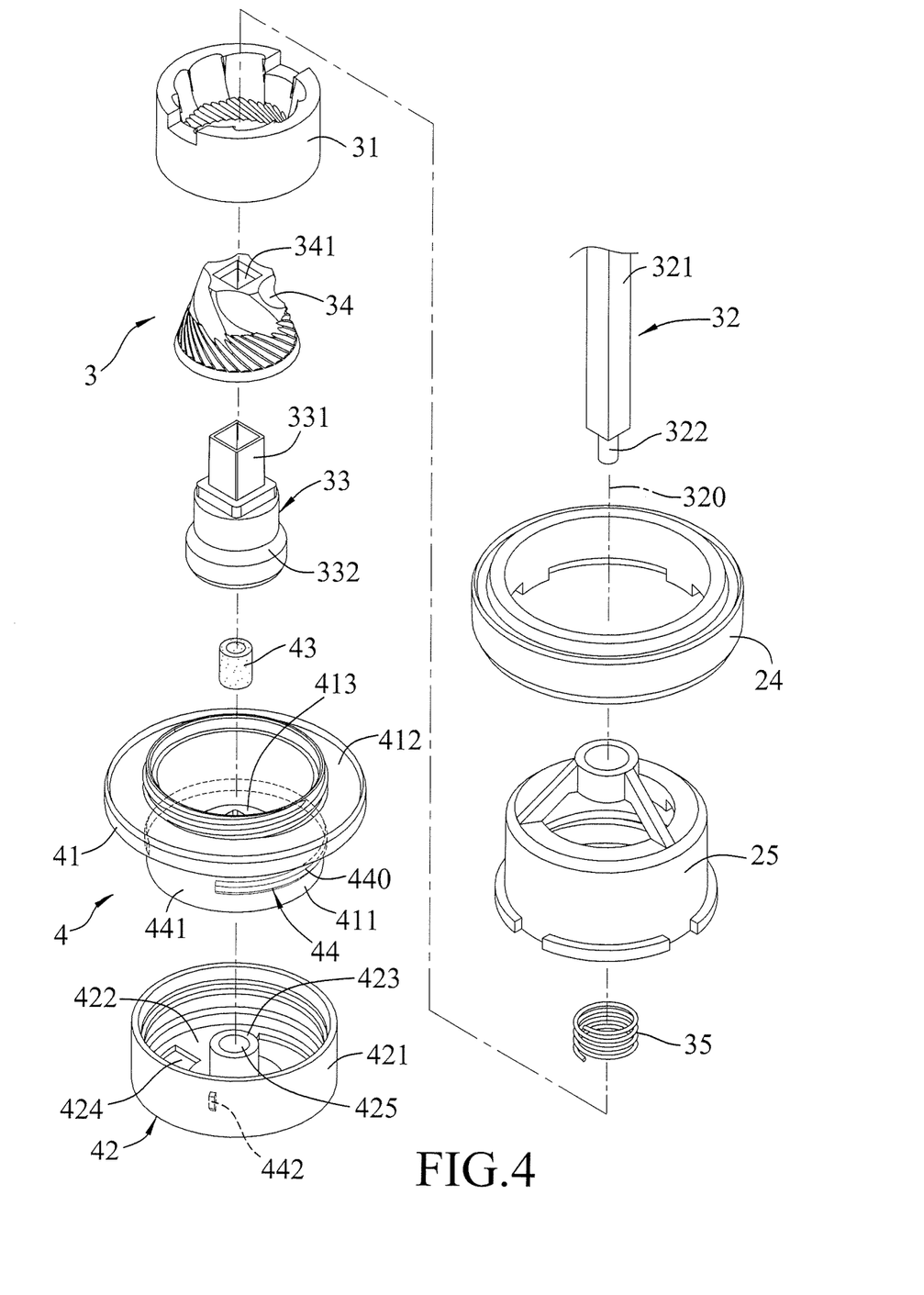
FIG. 4 is a fragmentary exploded view of the first embodiment.
Figure 5:
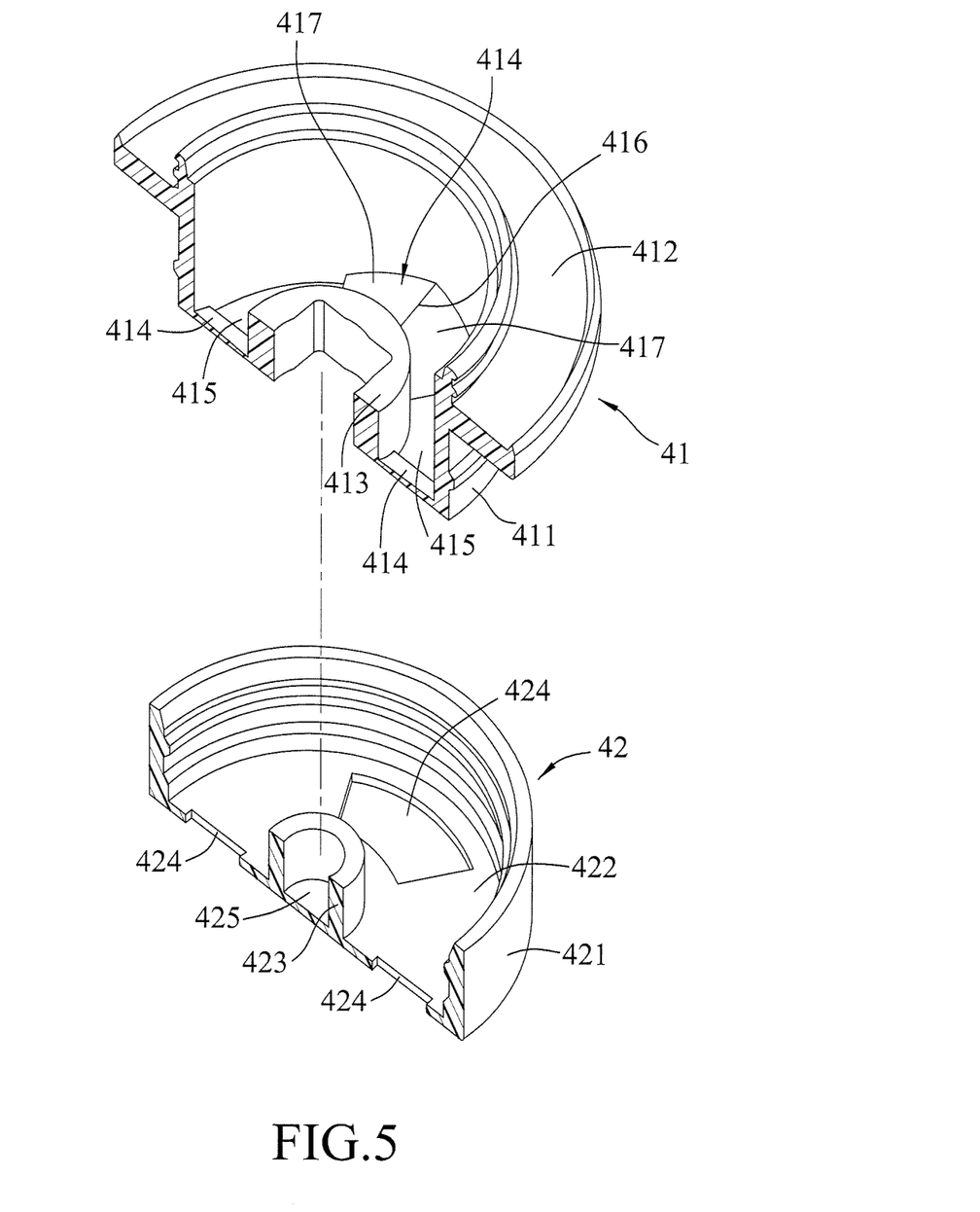
FIG. 5 is a partially exploded view of the first embodiment illustrating a stationary seat and a rotation control seat of a closure unit.

As shown in FIGS. 3 to 5, a first embodiment of a seasoning mill according to the present disclosure includes a receiving unit 2, a grinding unit 3 mounted on the receiving unit 2, and a closure unit 4.

The receiving unit 2 includes a container body 21, and a cover body 22 coupled rotatably to the container body 21 and cooperating with the container body 21 to define a receiving space 23. The receiving space 23 has a small-diameter space portion 231 and a large-diameter space portion 232 located under the small-diameter space portion 231. The container body 21 has an annular shoulder portion 211 disposed between the small-diameter space portion 231 and the large-diameter space portion 232. The receiving unit 2 further includes an outer surrounding seat 24 disposed in the large-diameter space portion 232 of the receiving space 23 and abutting against the annular shoulder portion 211 of the container body 21, and an inner surrounding seat 25 sleeved by the outer surrounding seat 24 and formed with a threaded portion 251 that is proximate to the bottom of the inner surrounding seat 25. The key feature of the seasoning mill does not reside in the inner surrounding seat 25 and the outer surrounding seat 24, and is therefore not further described herein.

The grinding unit 3 includes an outer grinding seat 31 disposed fixedly in the receiving space 23 and within the annular surrounding seat 25, a coupling shaft 32 co-rotatably connected to the cover body 22 and extending along and rotatable about a rotary axis 320, an ancillary sleeve seat 33 co-rotatably sleeved on the coupling shaft 32, an inner grinding seat 34 surrounded by the outer grinding seat 31 and co-rotatably sleeved on a top potion of the ancillary sleeve seat 33, and a resilient member 35 mounted between the inner annular seat 25 and the inner grinding seat 34. The outer grinding seat 31 and the inner grinding seat 34 cooperatively define a grinding space 36 therebetween. The inner grinding seat 34 is formed with a non-circular coupling hole 341, and the coupling shaft 32 extends fittingly through the coupling hole 341 so that the inner grinding seat 34 is co-rotatable with the coupling shaft 32.

The coupling shaft 32 has a drive section 321 (see FIG. 4) that extends fittingly through the coupling hole 341 of the inner grinding seat 34, and a control section 322 that has a round cross-section and that extends downwardly from a bottom end of the drive section 321 distal from the cover body 22. The ancillary sleeve seat 33 has a coupling sleeve portion 331 co-rotatably engaging the coupling hole 341 of the inner grinding seat 34, an annular sleeve portion 332 extending downwardly from the coupling sleeve portion 331 and outwardly of the inner grinding seat 34, and a shaft hole 333 extending through the coupling sleeve portion 331 and the annular sleeve portion 332. Specifically, the coupling sleeve portion 331 of the sleeve seat 33 is disposed between the coupling shaft 32 and the inner grinding seat 34. The shaft hole 333 has a coupling hole section 334 engaged with the drive section 321 of the coupling shaft 32, and a sleeve hole section 335 disposed under the coupling hole section 334. It should be noted that, in other embodiments, the outer and inner surrounding seats 24, 25 and the ancillary sleeve seat 33 may be omitted, such that the outer grinding seat 31 is connected directly to the container body 21 and the inner grinding seat 34 is coupled directly to the coupling shaft 32.

Figure 6:
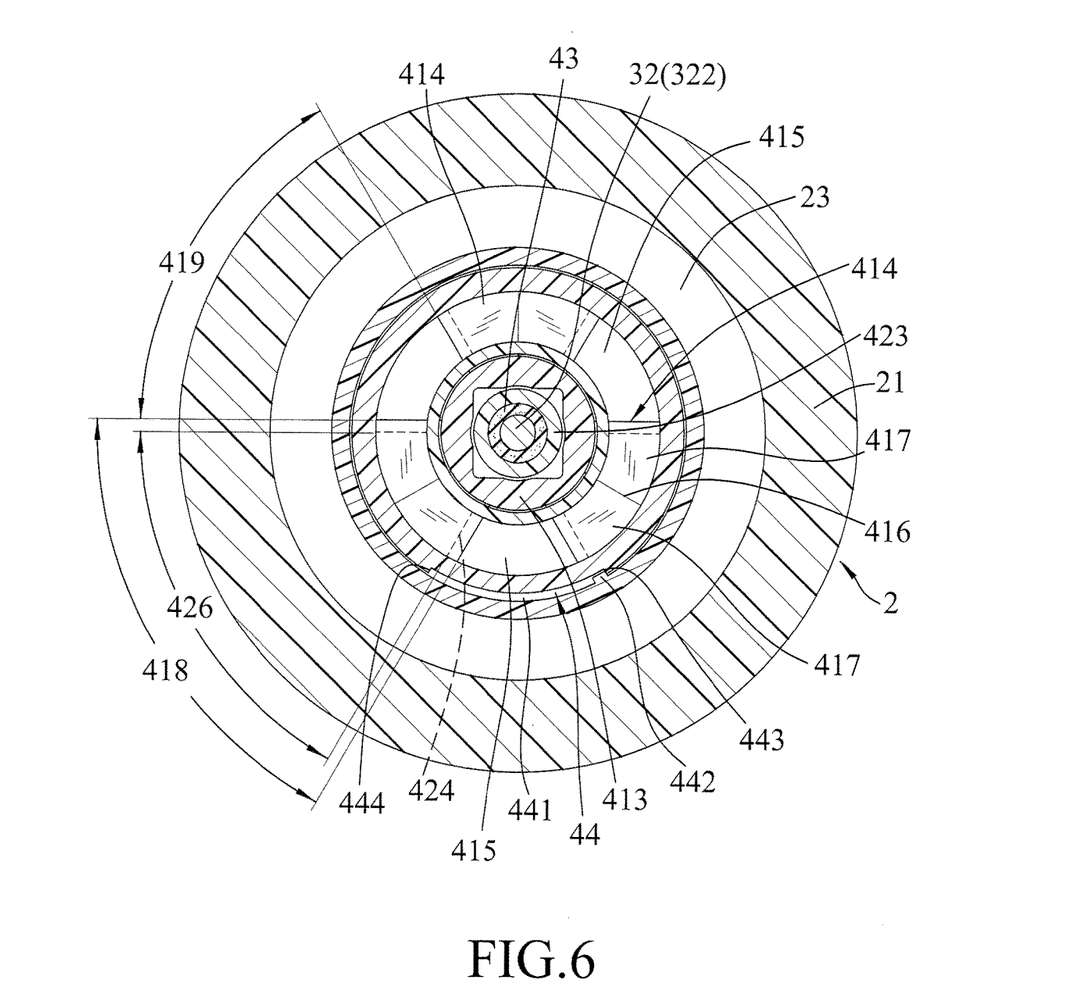
FIG. 6 is a transverse cross section view when the disclosure is at the closed position.

As further shown in FIGS. 4 to 6, the closure unit 4 includes a stationary seat 41, a rotation control seat 42, and a coupling member 43.

The stationary seat 41 is disposed fixedly in the receiving space 23, has a stationary surrounding wall 411 surrounding the rotary axis 320 of the coupling shaft 32, and has a top segment connected threadedly to the threaded portion 251 of the inner surrounding seat 25. The stationary seat 41 further has a ring wall 412 protruding outwardly from the outer surface of the stationary surrounding wall 411 and abutting against the bottom of the inner surrounding seat 25 and a bottom of the outer surrounding seat 24, a first tubular wall 413 surrounded by the stationary surrounding wall 411 and disposed in the sleeve hole section 335 of the shaft hole 333 of the ancillary sleeve seat 33 (such that the ancillary sleeve seat 33 is connected between the inner grinding seat 34 and the first tubular wall 413), a plurality of coupling protrusions 414 formed between the first tubular wall 413 and the stationary surrounding wall 411, and a plurality of grinding openings 415 formed between the first tubular wall 413 and the stationary surrounding wall 411 and arranged alternately with the coupling protrusions 414. In this embodiment, each of the coupling protrusions 414 has a protruding ridge 416 extending from the first tubular wall 413 to the stationary surrounding wall 411, and two inclined surfaces 417 inclined from the protruding ridges 416 to adjacent ones of the grinding openings 415, respectively.

In this embodiment, the rotation control seat 42 has a rotary surrounding wall 421 rotatably sleeved on the stationary surrounding wall 411 of the stationary seat 41, a cover wall 422 connected to a bottom end of the rotary surrounding wall 421 and formed with a plurality of control openings 424, and a second tubular wall 423 extending upwardly from the cover wall 422 and surrounded by the rotary surrounding wall 421. The second tubular wall 423 and the cover wall 422 cooperatively define a central hole 425 that receives the control section 322 of the coupling shaft 32.

Figure 8:
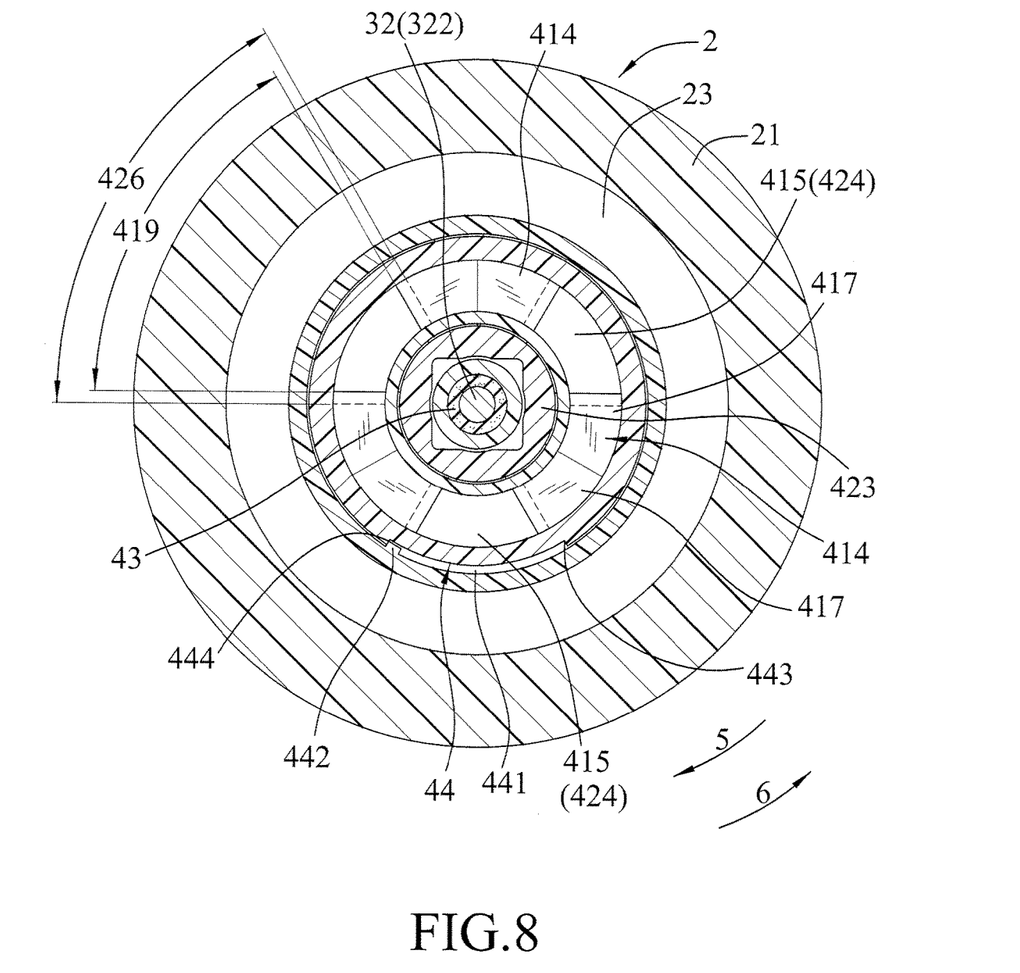
FIG. 8 is a transverse cross section view when the disclosure is at the opened position.

As shown in FIG. 6, each of the control openings 424 has opposite ends in a circumferential direction with respect to the rotary axis 320. A line which is defined between one of the opposite ends and the rotary axis 320 and another line defined between the other one of the opposite ends and the rotary axis 320 defines a first angle 426. Each of the coupling protrusions 414 has opposite ends in the circumferential direction. A line which is defined between one of the opposite ends and the rotary axis 320 and another line defined between the other one of the opposite ends and the rotary axis 320 defines a second angle 418 that is larger than the first angle 426. As shown in FIG. 8, each of the grinding openings 415 has opposite ends in the circumferential direction. A line which is defined between one of the opposite ends and the rotary axis 320 and another line defined between the other one of the opposite ends and the rotary axis 320 defines a third angle 419 that is smaller than the first angle 426.

In this embodiment, the coupling member 43 is made of materials such as rubber and silica gel, is sleeved on the control section 322 of the coupling shaft 32, and is interposed between the rotation control seat 42 and the control section 322 of the coupling shaft 32. The coupling member 43 is disposed for providing a resistive force between the coupling shaft 32 and the rotation control seat 42 which tends to secure fixedly the rotation control seat 42 onto the coupling shaft 32 such that the rotation control seat 42 is co-rotatable with the coupling shaft 32 relative to the stationary seat 41 from a closed position (see FIG. 6) when a rotational force is exerted on the coupling shaft 32, where the control openings 424 are not respectively registered with the grinding openings 415 and are blocked by the cover wall 422, to an opened position (see FIGS. 7 and 8), where the control openings 424 are respectively registered with the grinding openings 415, and such that the rotation control seat 42 is capable of being maintained at the opened position when the rotational force is released.

Figure 7:
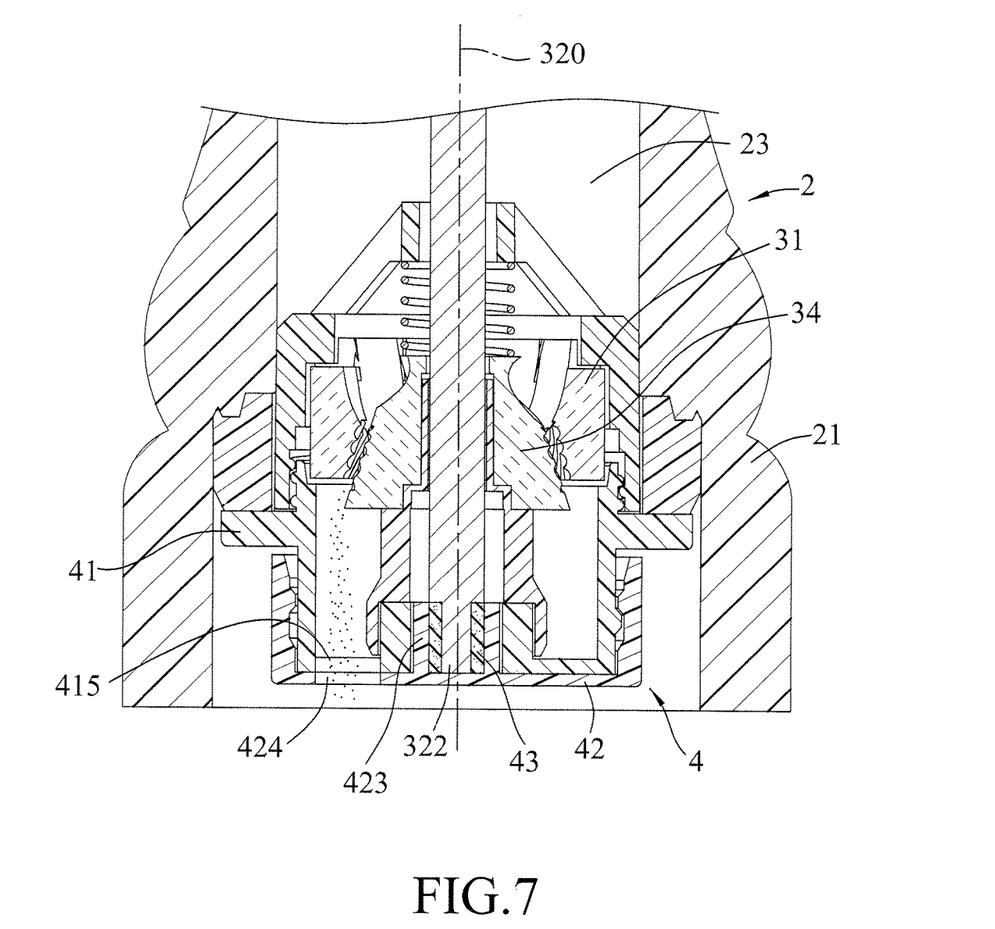
FIG. 7 is a fragmentary cross section view when the disclosure is at an opened position.

The control unit 44 is provided between the stationary seat 41 and the rotation control seat 42. In this embodiment, the control unit 44 has a C-shaped projection 440 formed on an outer surrounding surface of the stationary surrounding wall 411 and disposed around the rotary axis 320, a control groove 441 formed on the stationary surrounding wall 411 and defined by two ends of the C-shaped projection 440, and a control block 442 formed on an inner surrounding surface of the rotary surrounding wall 421 into the control groove 441. As such, rotation of the rotation control seat 42 relative to the stationary seat 41 is limited by the control unit 44. It should be noted that the positions of the C-shaped projection 440 and the control block 442 may be interchanged. For example, the C-shaped projection 440 and the control groove 441 may be mounted on the rotary surrounding wall 421, and the control block 442 may be formed on the stationary surrounding wall 411. The control groove 441 has a closed end 443 adjacent to one of the two ends of the C-shaped projection 440, and an opened end 444 spaced apart from the closed end 443 and adjacent to the other one of the two ends of the C-shaped projection 440.

As shown in FIGS. 3, 5 and 6, when the rotation control seat 42 is at the closed position, since the grinding openings 415 are covered by the cover wall 422, ground seasoning is not permitted to drop out from the grinding openings 415 of the stationary seat 41, thereby maintaining a clean environment around the location where the seasoning mill is stored. At this time, the control block 442 is at the closed end 443 of the control groove 441.

As shown in FIGS. 3, 7, and 8, when an user rotates the cover body 22 of the receiving unit 2 in a first rotational direction 5, the coupling shaft 32 is driven to rotate about the rotary axis 320, thereby driving rotation of the inner grinding seat 34 relative to the outer grinding seat 31 to grind, for example, peppercorns. Meanwhile, by virtue of the coupling member 43, the rotation control seat 42 is rotated together with the coupling shaft 32. When the rotation control seat 42 is rotated from the closed position to the opened position, due to the abovementioned configuration that the first angle 426 is larger than the third angle 419, and that each coupling protrusion 424 has the inclined surfaces 417, ground pepper is allowed to drop out from the receiving space 23 via the control openings 424 and the grinding openings 415. When the rotational control seat 42 is at the opened position, the control block 442 is at the opened end 444 of the control groove 441. If the user keeps rotating the cover body 22 in the first rotational direction 5 and exerts a rotational force larger than the resistive force between the coupling shaft 32 and the rotation control seat 42, the coupling shaft 32 can be driven to rotate alone in the first rotational direction 5 to drive grinding action of the grinding unit 3 without rotating the rotation control seat 42.

After use, the user need only rotate the cover body 22 in a second rotational direction 6 that is opposite to the first rotational direction 5 to move the rotational control seat 42 back to the closed position.

In conclusion, the opening or closing of the grinding openings 415 of the stationary seat 41 can be controlled by rotating the cover body 22 in the first rotational direction 5 or the second rotational direction 6. The abovementioned structure can act in a simpler fashion than the conventional pepper mill 1, and the abovementioned drawback of elastic fatigue of the resilient member of the conventional pepper mill 1 can be overcome.

Figure 9:
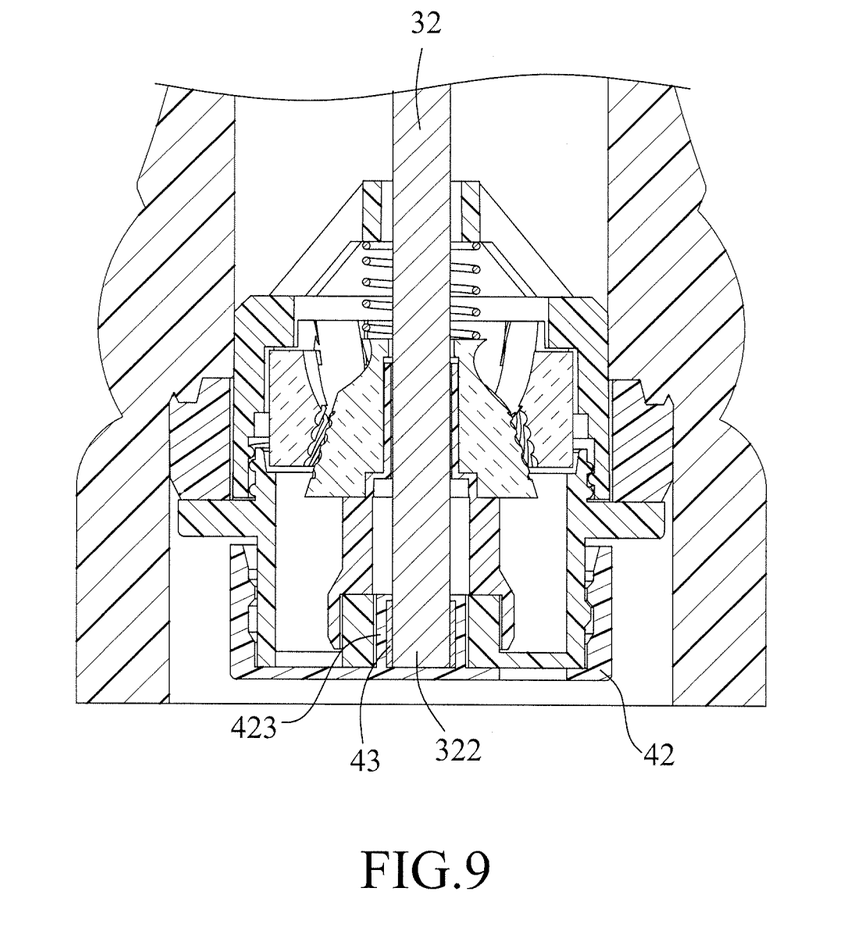
FIG. 9 is a fragmentary cross section view of a second embodiment of the seasoning mill according to the disclosure.

As shown in FIG. 9, the second embodiment has a structure similar to that of the first embodiment. The main difference between this embodiment and the previous embodiment resides in the following. In this embodiment, the control section 322 of the coupling shaft 32 is made of a magnetic metal, and the coupling member 43 is a magnet embedded in the second tubular wall 423 of the rotational control seat 42 and is attached magnetically on an outer surrounding surface of the control section 322.

Figure 10:
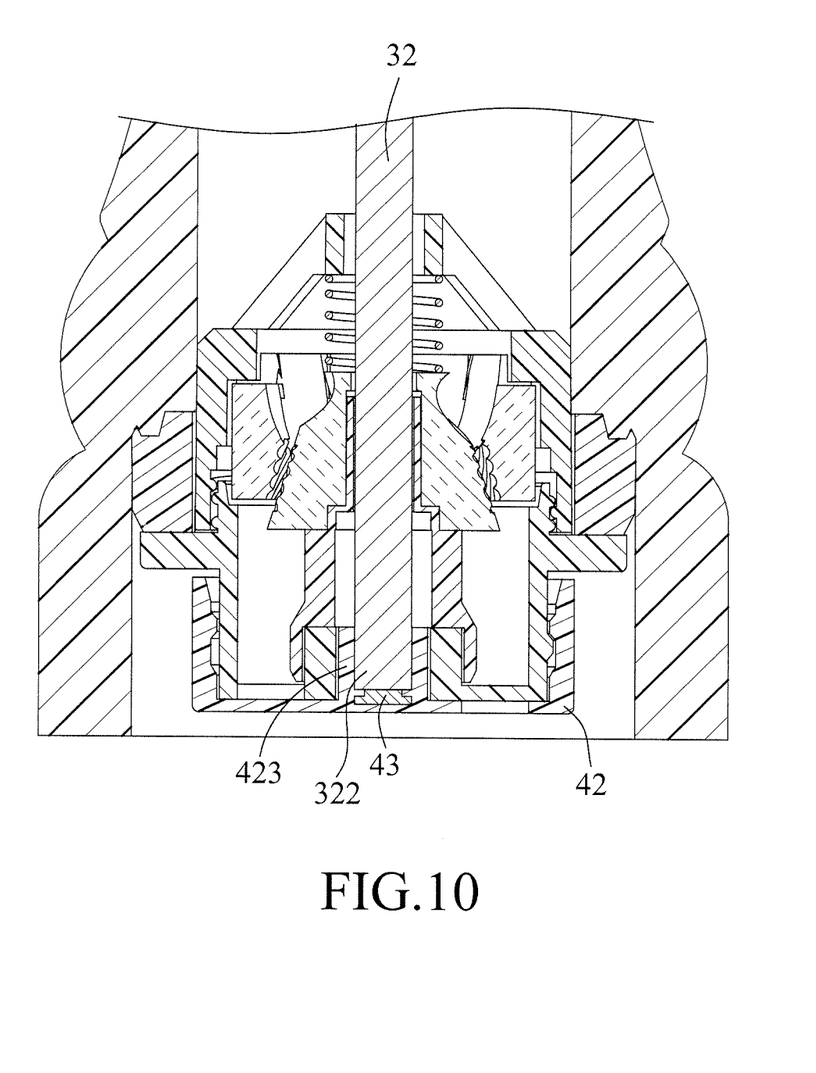
FIG. 10 is a fragmentary cross section view of a third embodiment of the seasoning mill according to the disclosure.

As shown in FIG. 10, the third embodiment has a structure similar to that of the second embodiment. The main difference between this embodiment and the second embodiment resides in that the coupling member 43 is mounted on the rotational control seat 42, and is disposed to attach to the control section 322 of the coupling shaft 32.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A seasoning mill comprising:
a receiving unit that defines a receiving space therein;
a grinding unit that includes an outer grinding seat disposed fixedly in said receiving space, an inner grinding seat surrounded by said outer grinding seat, and a coupling shaft coupled to said inner grinding seat and rotatable for driving said inner grinding seat to rotate relative to said outer grinding seat; and
a closure unit that includes
a stationary seat disposed fixedly in said receiving space and having at least one grinding opening,
a rotation control seat having a cover wall formed with at least one control opening, and
a coupling member disposed for providing a resistive force between said coupling shaft and said rotation control seat which tends to secure fixedly said rotation control seat onto said coupling shaft such that said rotation control seat is co-rotatable with said coupling shaft relative to said stationary seat from a closed position when a rotational force is exerted on said coupling shaft, where said at least one control opening is not registered with said at least one grinding opening and is blocked by said cover wall, to an opened position, where said at least one control opening is registered with said at least one grinding opening, and that said rotation control seat is configured to be maintained at the opened position when the rotational force is released.

2. The seasoning mill as claimed in claim 1, wherein:
said stationary seat further has a stationary surrounding wall surrounding a rotary axis of said coupling shaft;
said rotation control seat has a rotary surrounding wall sleeved on said stationary surrounding wall; and
said closure unit further includes a control unit provided between said stationary surrounding wall and said rotary surrounding wall for limiting the rotation of said rotation control seat relative to said stationary seat.

3. The seasoning mill as claimed in claim 2, wherein said control unit has a control groove formed in one of said stationary surrounding wall and said rotary surrounding wall, and a control block mounted on the other one of said stationary surrounding wall and said rotary surrounding wall.

4. The seasoning mill as claimed in claim 2, wherein said stationary seat has a plurality of said grinding openings, and said cover wall is formed with a plurality of said control openings that are respectively registered with said grinding openings when said rotation control seat is at the opened position.

5. The seasoning mill as claimed in claim 4, wherein said stationary seat further has:
a first tubular wall surrounded by said stationary surrounding wall; and
a plurality of coupling protrusions formed between said first tubular wall and said stationary surrounding wall and arranged alternately with said grinding openings, each of said coupling protrusions having a protruding ridge, and at least one inclined surface inclined from said protruding ridge to an adjacent one of said grinding openings.

6. The seasoning mill as claimed in claim 5, wherein:
Said receiving unit includes a container body;
each of said control openings has opposite ends in a circumferential direction with respect to a center portion of said first tubular wall, a line which is defined between one of said opposite ends and said center portion of said first tubular wall and another line defined between the other one of said opposite ends and said center portion of said first tubular wall defining a first acute angle and a first circumferential distance that corresponds to the first acute angle on said container body;
each of said coupling protrusions has opposite ends in the circumferential direction, a line which is defined between one of said opposite ends and said center portion of said first tubular wall and another line defined between the other one of said opposite ends and said center portion of said first tubular wall defining a second acute angle and a second circumferential distance that corresponds to the second acute angle on said container body;
each of said grinding openings has opposite ends in the circumferential direction, a line which is defined between one of said opposite ends and said center portion of said first tubular wall and another line defined between the other one of said opposite ends and said center portion of said first tubular wall defining a third acute angle and a third outermost circumferential distance that corresponds to the third acute angle on said container body; and
the third circumferential distance is smaller than the first circumferential distance, and the first circumferential distance is smaller than the second circumferential distance.

7. The seasoning mill as claimed in claim 5, wherein said grinding unit further includes an ancillary sleeve seat connected between said inner grinding seat and said first tubular wall of said stationary seat.

8. The seasoning mill as claimed in claim 1, wherein said receiving unit includes a container body, and a cover body cooperating with said container body to define said receiving space, said coupling shaft being co-rotatably connected to said cover body and having a control section that has a round cross section and that is distal from said cover body, said coupling member being sleeved on said control section of said coupling shaft and interposed between said rotation control seat and said control section of said coupling shaft.

9. The seasoning mill as claimed in claim 8, wherein said coupling member is made of materials that provide the resistive force.

10. The seasoning mill as claimed in claim 9, wherein said coupling member is made of rubber.

11. The seasoning mill as claimed in claim 9, wherein said coupling member is made of silica gel.

12. The seasoning mill as claimed in claim 1, wherein said receiving unit includes a container body, and a cover body cooperating with said container body to define said receiving space, said coupling shaft being co-rotatably connected to said cover body and having a control section that is distal from said cover body, said coupling member being attached magnetically on an outer surrounding surface of said control section of said coupling shaft.

13. The seasoning mill as claimed in claim 1, wherein said receiving unit includes a container body, and a cover body cooperating with said container body to define said receiving space, said coupling shaft being co-rotatably connected to said cover body and having a control section that is distal from said cover body, said coupling member being mounted on said rotation control seat, disposed under said control section, and attracting magnetically said control section.

* * * * *